US011215492B2

(12) United States Patent
Hashemian et al.

(10) Patent No.: US 11,215,492 B2
(45) Date of Patent: Jan. 4, 2022

(54) DIFFERENTIAL PRESSURE BASED LEVEL MEASUREMENT SYSTEMS AND METHODS

(71) Applicant: Analysis and Measurement Services Corporation, Knoxville, TN (US)

(72) Inventors: Alexander Hashem Hashemian, Knoxville, TN (US); Cory Steven Oakley, Corryton, TN (US)

(73) Assignee: Analysis and Measurement Services Corporation, Knox County, TN (US)

(*) Notice: Subject to any disclaimer, the term of this patent is extended or adjusted under 35 U.S.C. 154(b) by 36 days.

(21) Appl. No.: 16/696,349

(22) Filed: Nov. 26, 2019

(65) Prior Publication Data

US 2020/0182677 A1 Jun. 11, 2020

Related U.S. Application Data

(60) Provisional application No. 62/771,381, filed on Nov. 26, 2018.

(51) Int. Cl.
*G05D 16/20* (2006.01)
*G01F 23/16* (2006.01)

(52) U.S. Cl.
CPC .......... *G01F 23/164* (2013.01); *G05D 16/20* (2013.01)

(58) Field of Classification Search
CPC ............................. G01F 23/14; G01F 23/164
See application file for complete search history.

(56) References Cited

U.S. PATENT DOCUMENTS

| 4,782,451 | A  | * | 11/1988 | Mazzarella | G01F 23/0069 340/680 |
| 5,568,882 | A  | * | 10/1996 | Takacs | G01F 23/168 222/155 |
| 5,868,280 | A  | * | 2/1999 | Schroeder | B67D 1/04 222/64 |
| 10,458,833 | B2 | * | 10/2019 | Rossi | A61M 1/3666 |
| 2007/0084423 | A1 | * | 4/2007 | LeBeaux | F02M 25/10 123/1 A |
| 2012/0067133 | A1 | * | 3/2012 | Waldrop | G01L 19/0015 73/753 |
| 2016/0054164 | A1 | * | 2/2016 | Hershey | G01F 23/246 73/292 |
| 2017/0089746 | A1 | * | 3/2017 | Rossi | A61M 1/3627 |

* cited by examiner

*Primary Examiner* — Jamel E Williams
(74) *Attorney, Agent, or Firm* — Pitts & Lake, P.C.

(57) ABSTRACT

A fluid level measurement system, including an instrument line configured for installation within a fluid storage tank or vessel, the instrument line having a first end configured to be installed below a fluid level of the storage tank and a second end configured to be installed above the fluid level of the storage tank, the first end including a first pressure diaphragm plate configured to communicate with fluid within the storage tank, a pressure sensor configured to be connected to the second end of the instrument line, and a relief valve configured to open and allow high-pressure gas in the tank to escape through a ventilation port in order to depressurize the tank until tank pressure equalizes with the surrounding atmospheric pressure.

5 Claims, 5 Drawing Sheets

DIFFERENTIAL PRESSURE BASED LEVEL MEASUREMENT SYSTEMS AND METHODS

CROSS-REFERENCE TO RELATED APPLICATIONS

This application claims priority from U.S. Provisional Application No. 62/771,381 filed on Nov. 26, 2018.

BACKGROUND OF THE INVENTION

1. Field of the Invention

The present invention relates to an approach for measuring fluid level in a tank or vessel using pressure or differential pressure sensors. The concept presented herein allows for the use of conventional pressure or differential pressure sensors to measure fluid level in a tank or vessel in which there can be no penetrations through the tank or vessel wall below the fluid surface.

The present innovation describes a level measurement system or assembly for measuring fluid level in a tank or vessel using pressure or differential pressure sensors without the need for a penetration into the tank or vessel below the fluid surface by incorporating a pressure sensing instrument line internal to the tank or vessel that can be used to measure the hydrostatic head or weight of the fluid at the bottom of the tank or vessel and determine fluid level in the tank or vessel. The proposed level measurement system eliminates the possibility of a leak through a penetration into the tank or vessel below the fluid surface which otherwise would result in draining of the tank or vessel to the level of the penetration.

2. Description of the Related Art

For many industrial plant applications, fluid level is a critical process parameter and fluid level data is used by the plant control and safety systems to safely and efficiently operate the plant. Fluid level in a tank or vessel may be measured using ultrasonic sensors, guided-wave or through-air radar systems, capacitance sensors, laser systems, thermal dispersion elements, or other devices. However, for large tanks or vessels with complex geometries, these technologies may not be suitable. As a result, in some applications, fluid level in a tank or vessel can be measured using pressure or differential pressure sensors. Pressure or differential pressure based level measurements typically require at least one penetration through a tank or vessel. This penetration must be below the fluid surface and is typically located near the bottom of the tank or vessel to measure the total hydrostatic head or weight of the fluid and determine level within the entire tank or vessel. Fluid level cannot be measured via pressure or differential pressure below this penetration point. For differential pressure based level measurement systems, another penetration can be made through the tank or vessel above the fluid level and located near the top of the tank or vessel.

For pressure based level measurements, the single penetration below the fluid surface enables a pressure sensor to access the fluid at the point of penetration to measure the hydrostatic head or weight of the fluid at that point. The fluid level is proportional to the hydrostatic pressure, and thus, fluid level may be determined. This approach is generally used for systems that do not require a reference pressure for compensation such as open tanks or vessels exposed to constant atmospheric pressure on the fluid surface. For closed systems that require a reference pressure for compensation, differential pressure based level measurements are preferred. As with pressure based level systems, a penetration below the fluid surface is required for differential pressure based level systems. In addition, another penetration is required that is located above the first penetration and typically above the fluid level near the top of the tank or vessel. Instrument lines connect the penetrations to a differential pressure sensor that measures the difference in pressure at the two penetration points and this value is proportional to the fluid level in the tank or vessel. For pressure or differential pressure based systems, the respective pressure or differential pressure sensor is located near the bottom of the tank or vessel at the same leveled plane as the lower penetration.

For some nuclear power plant applications, such as reactor vessel level measurement in small modular reactors (SMRs), conventional pressure or differential pressure-based systems are not feasible. For a closed system like that of an SMR vessel, a differential pressure based level system would require that the differential pressure sensor be located near the lower penetration which would be in the proximity of the reactor core and exposed to high levels of radiation. Sensor electronics cannot survive the conditions of that environment long term. Furthermore, pressure or differential pressure based systems involve one or more penetrations through the tank or vessel as well as external instrument lines to connect a sensor to these penetration points. Penetrations and instrument lines are potential points of failure. In the event of a leak through the lower penetration or instrument line, the tank or vessel may be drained of the fluid to this point. For SMRs, this fluid is reactor coolant, and a leak of the reactor coolant could result in reactor core damage. In the event of a leak through any penetrations below the top of the reactor core, the reactor vessel may drain, uncover the reactor core, and lead to a reactor meltdown. Penetrations located above the top of the reactor core eliminate the possibility of this accident scenario but cannot enable level indication below the top of the reactor core which is important to measure, especially for post-accident monitoring purposes.

Therefore, what is desired is an improved level measurement system that does not require a lower penetration below the fluid surface vulnerable to leaking and that enables the use of conventional pressure or differential pressure sensors installed at the top of the tank or vessel (which is generally a milder ambient environment conducive to sensor electronics and hands-on maintenance activities).

BRIEF SUMMARY OF THE INVENTION

Example embodiments of the present general inventive concept describe a pressure or differential pressure-based level measurement system that enables fluid level measurement in a tank or vessel without the need for a penetration through the wall of the tank or vessel below the fluid surface.

Example embodiment can include a small-diameter instrument line, channel, capillary, tube, or pipe installed within a tank or vessel that enables measurement of the hydrostatic head or weight of a fluid using a pressure or differential pressure sensor without the need for external instrument lines. The internal instrument line, channel, capillary, tube, or pipe penetrates the tank or vessel at a single point located above the fluid surface which eliminates the potential to drain the tank or vessel in the event of a leak at the penetration point and enables the associated pressure or differential pressure sensor to be installed at the top of the tank or vessel.

In some embodiments, the instrument line, channel, capillary, tube, or pipe can include an oil-(or other material) filled system capped by a pressure diaphragm plate at both ends that seals the filler material within the instrument line, channel, capillary, tube, or pipe.

In some embodiments, the level measurement system can include a relief valve system that penetrates the tank or vessel at a single point located above the fluid surface. In the event of a failure of the penetration and pressure diaphragm plates in a closed tank or vessel, the system can actuate a relief valve to equalize the pressure within the tank or vessel with the surrounding atmospheric pressure through a ventilation port to mitigate leaking and prevent draining of the tank or vessel. When the relief valve is open, high-pressure gas will escape freely through the ventilation port and thus depressurize the tank or vessel until it equalizes with the surrounding atmosphere. For tanks or vessels open to atmosphere, actuation of a relief valve may be unnecessary as a failure of the penetration and pressure diaphragm plates may not result in the draining of the tank or vessel.

BRIEF DESCRIPTION OF THE DRAWINGS

The above-mentioned features of the present invention will become more clearly understood from the following detailed description of the invention read together with the drawings in which.

DETAILED DESCRIPTION OF THE INVENTION

The present invention enables fluid level measurement in a tank or vessel using conventional pressure or differential pressure sensors without the need for a penetration through the tank or vessel below the fluid surface which is particularly important for certain industrial applications such as reactor pressure vessel level measurements in small modular reactors.

Figure 1A:
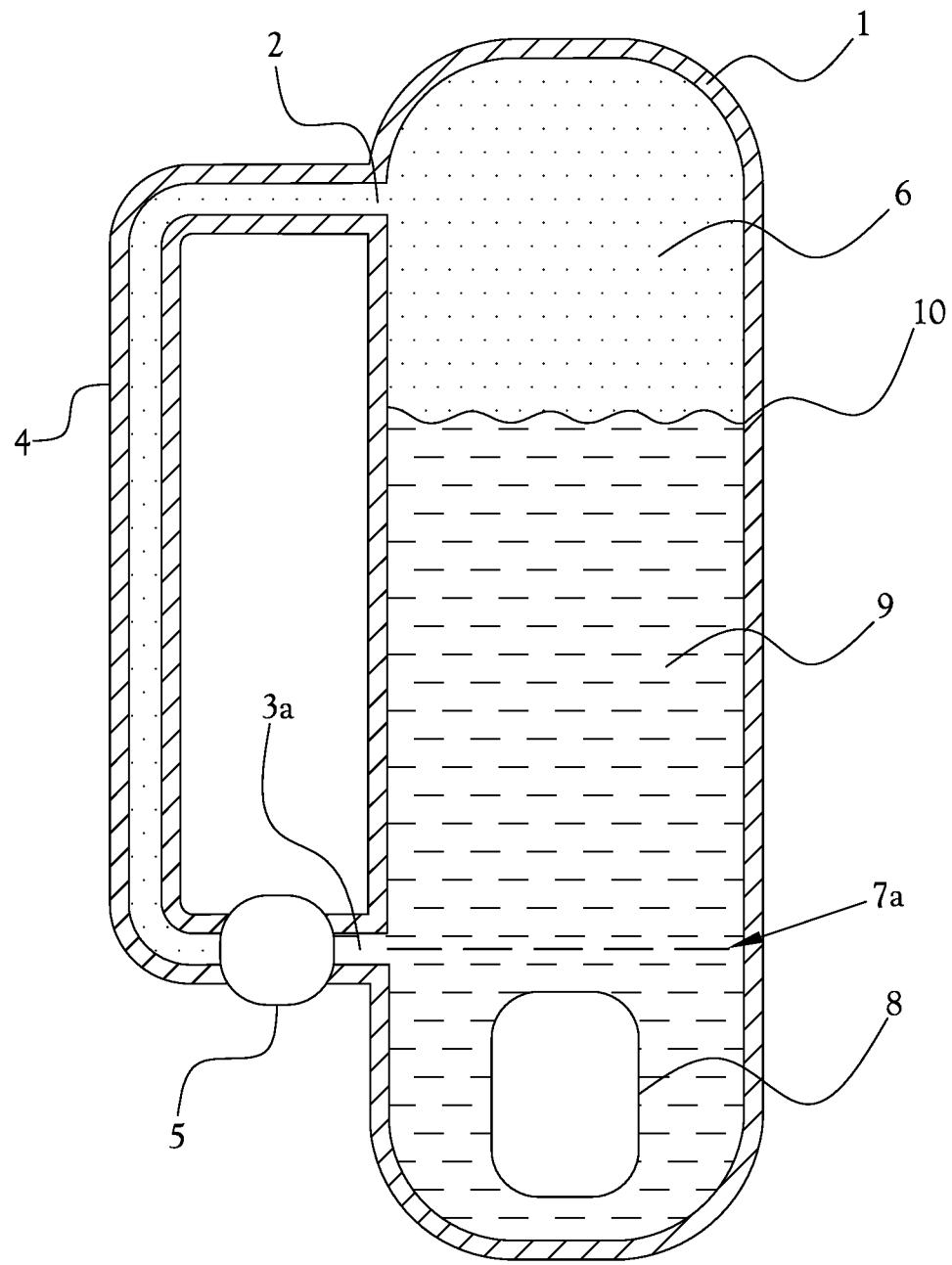
FIG. 1a is a simplified diagram of a reactor pressure vessel illustrating a conventional differential pressure-based level measurement approach that requires two penetrations and external instrument lines and cannot be used to measure level below the top of a reactor core.
Figure 1B:
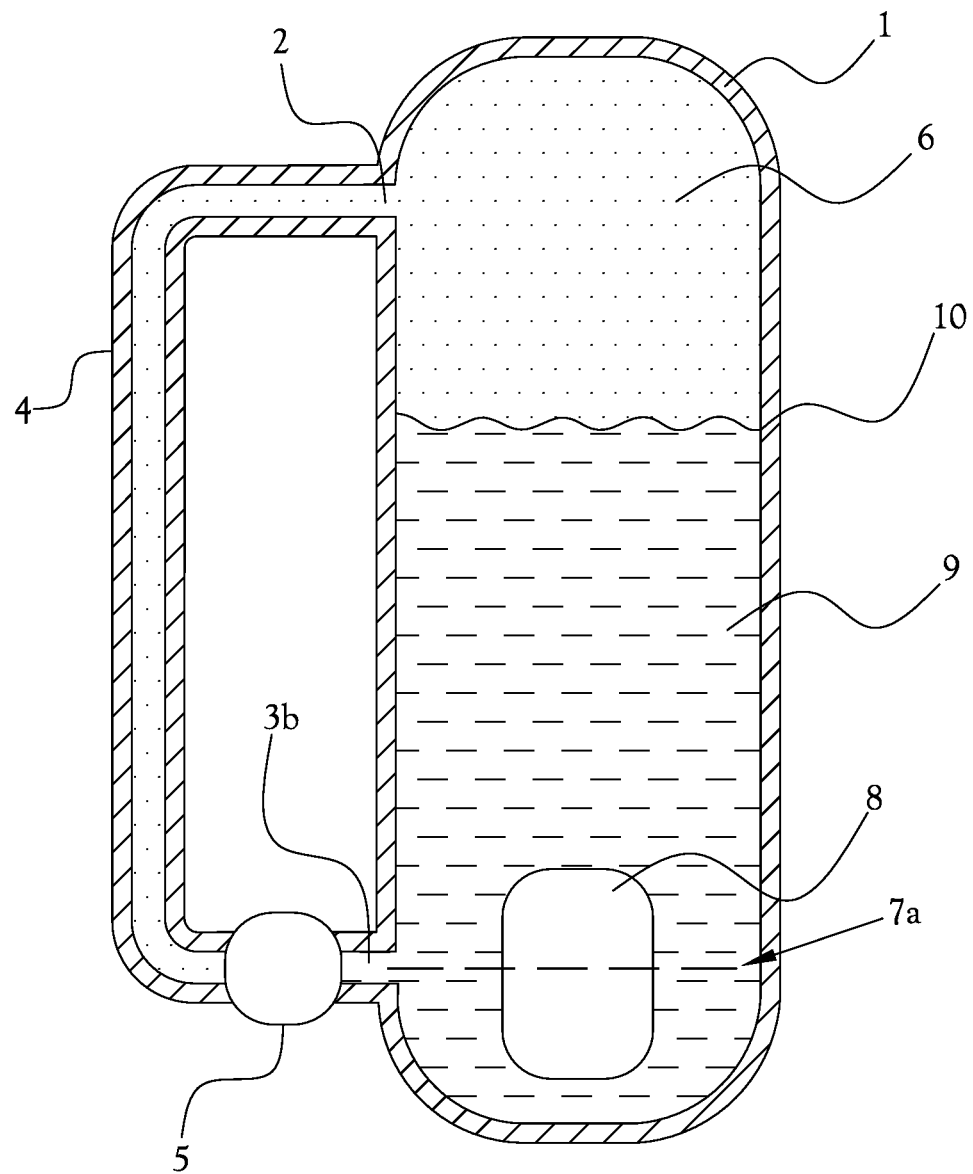
FIG. 1b is a simplified diagram of a reactor pressure vessel illustrating a conventional differential pressure based level measurement approach that requires two penetrations and external instrument lines and is capable of measuring level below the top of a reactor core but vulnerable to uncovering the core in the event of a leak.

FIGS. 1a and 1b illustrate conventional differential pressure-based level measurement approaches as applied to a reactor pressure vessel level measurement application for small modular reactors. In order to measure fluid 9 level in a tank or vessel 1 using the conventional method, an upper penetration 2 above the fluid surface 10 and a lower penetration 3a below the fluid surface 10 are required. An instrument line 4 connects the differential pressure sensor 5 to the penetration points and enables the sensor to measure the difference between the closed system pressure 6 above the fluid surface 10 and the hydrostatic head or weight of the fluid above the top of the core 7a at the lower penetration 3a. For this configuration, the lower penetration 3a is located above the top of the reactor core 8. In the event of a leak at the lower penetration 3a, the fluid 9 will drain out of the vessel 1 until the fluid surface 10 reaches the lower penetration 3a. In this scenario, the reactor core 8 will not be uncovered. However, level measurement below the top of the reactor core 8 cannot be achieved for this configuration. If the lower penetration 3b is located below the top of the reactor core 8, the hydrostatic head or weight of the fluid below the top of the core 7a may be measured but at the risk of uncovering the reactor core 8 in the event of a leak at the lower penetration 3b.

Figure 2:
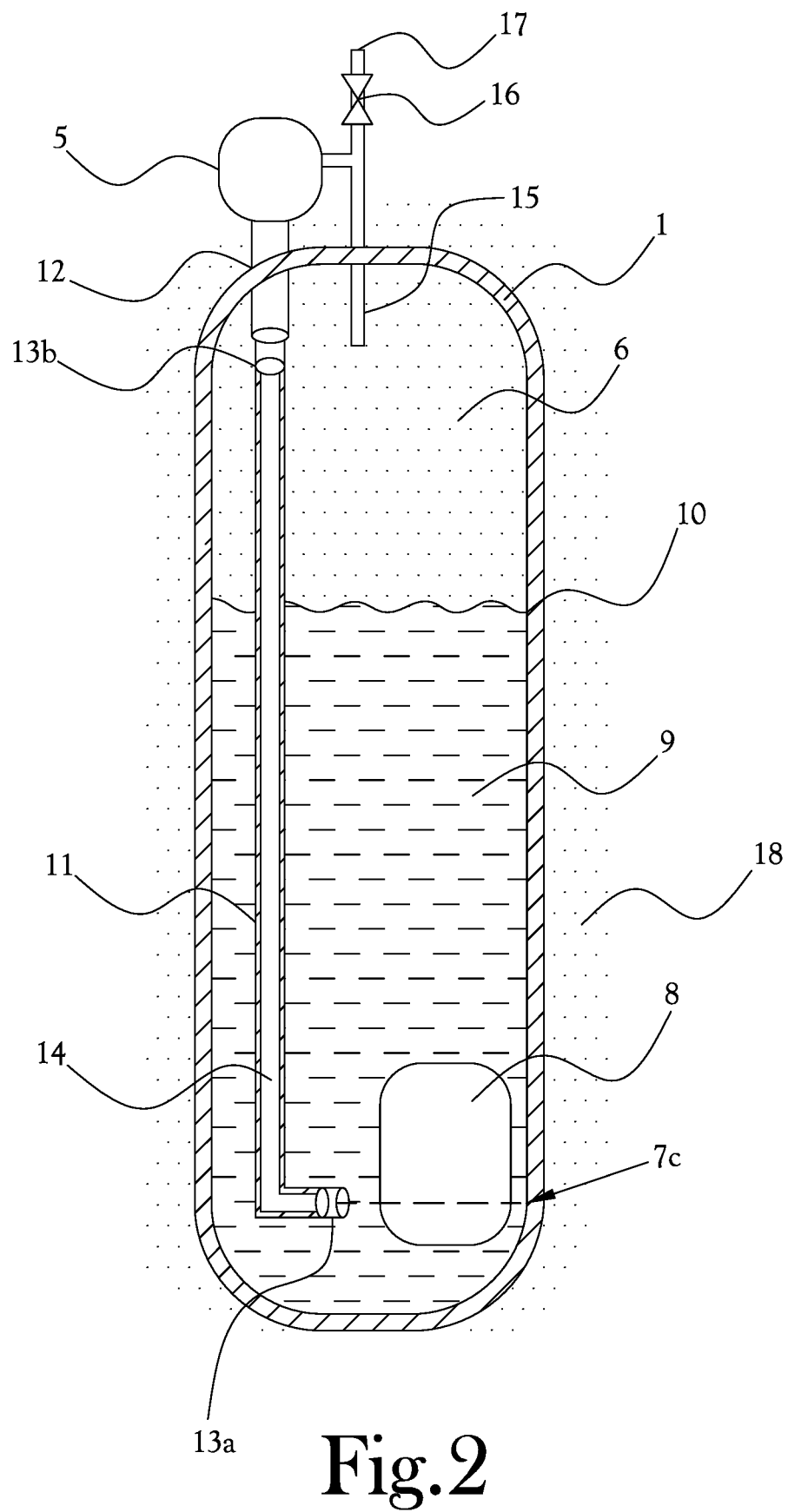
FIG. 2 is a simplified diagram of a reactor pressure vessel illustrating one possible configuration of the present invention that includes an oil-filled instrument line that is capped with two pressure diaphragm plates at both ends of the line and connected to a sensor to enable measurement of the vessel fluid level below the top of the reactor core.

FIG. 2 illustrates the one possible configuration of the present invention as applied to a reactor pressure vessel level measurement application for small modular reactors. In order to measure fluid 9 level in a tank or vessel 1 using the proposed innovative approach, one upper penetration 12 through the vessel 1 can be used to enable the internal instrument line 11 (which may be filled with oil or some other material 14 and capped at the bottom of the instrument line 11 with a pressure diaphragm plate 13a and capped at the top of the instrument line 11 with a pressure diaphragm plate 13b) to access a point below the top of the reactor core 8 and enable measurement of the hydrostatic head or weight of the fluid below the top of the core 7c using a differential pressure sensor 5. For example, the instrument line 11 can be configured for installation within the fluid storage tank or vessel 1, the instrument line having a first end (e.g., lower end) configured to be installed below a fluid level of the storage tank and a second end (e.g. upper end) configured to be installed above the fluid level of the storage tank, the first end including a first pressure diaphragm plate configured to communicate with fluid within the storage tank. The instrument line 11 feeds the differential pressure sensor 5 with hydrostatic head pressure to be measured. The differential pressure sensor 5 may be installed on the top of the vessel 1 and can include a low pressure input port 15 for reference measurement of the closed system pressure 6 above the fluid surface 10 and a ventilation port 17 that may be used (in the event of a failure of the penetration 12 and pressure diaphragm plates 13) to equalize the closed system pressure 6 within the vessel 1 with the surrounding atmospheric pressure 18 via actuation of a relief valve 16 to prevent fluid loss. Opening of the relief valve 16 will mitigate leaking and prevent draining of the vessel 1.

Figure 3:
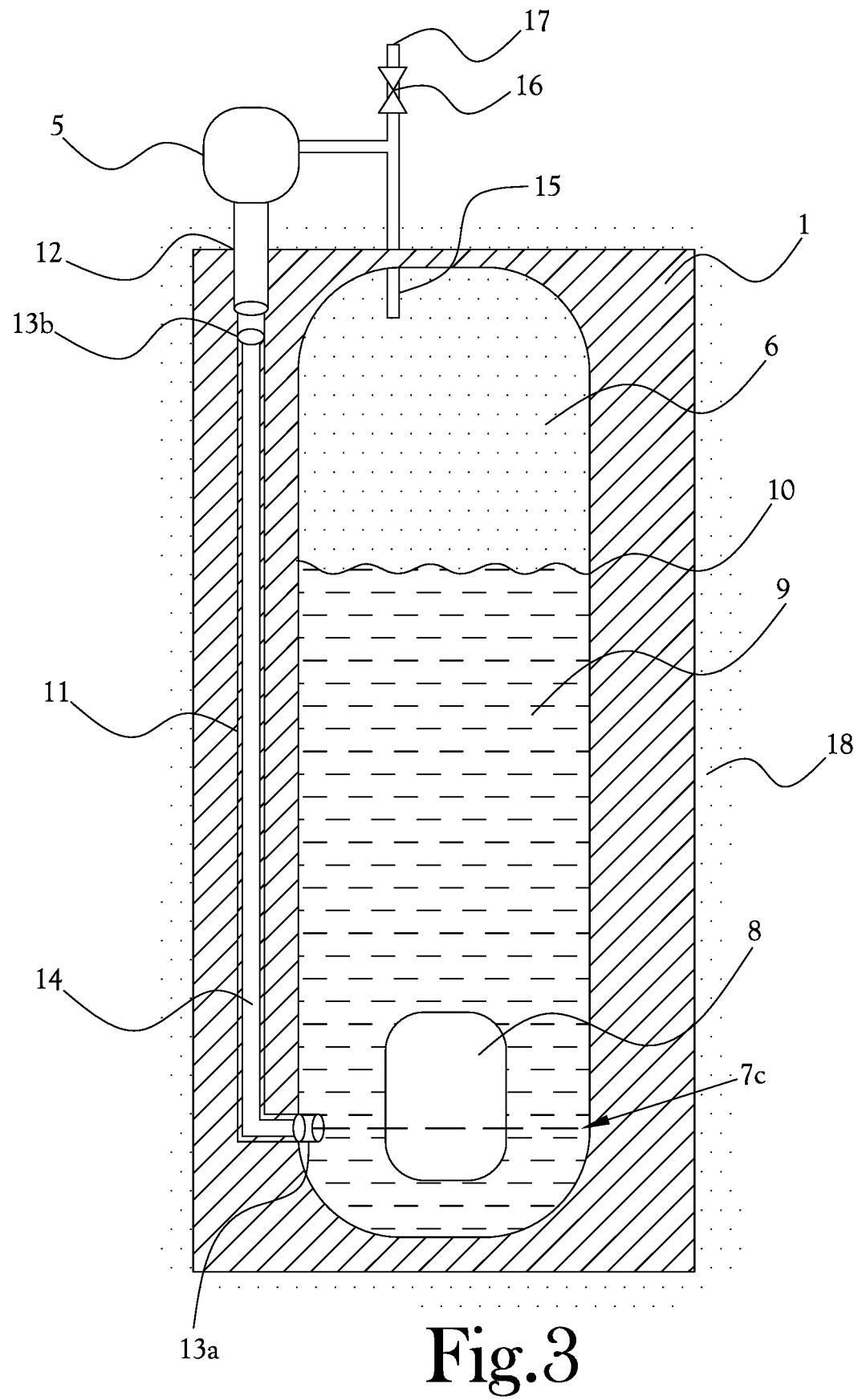
FIG. 3 is a simplified diagram of a reactor pressure vessel illustrating another possible configuration of the present invention in which the instrument line is integrated into the wall of the vessel.

FIG. 3 illustrates another possible configuration of the present invention as applied to a reactor pressure vessel level measurement application for small modular reactors in which the instrument line 11 is integrated into the wall of the tank or vessel 1.

Figure 4:
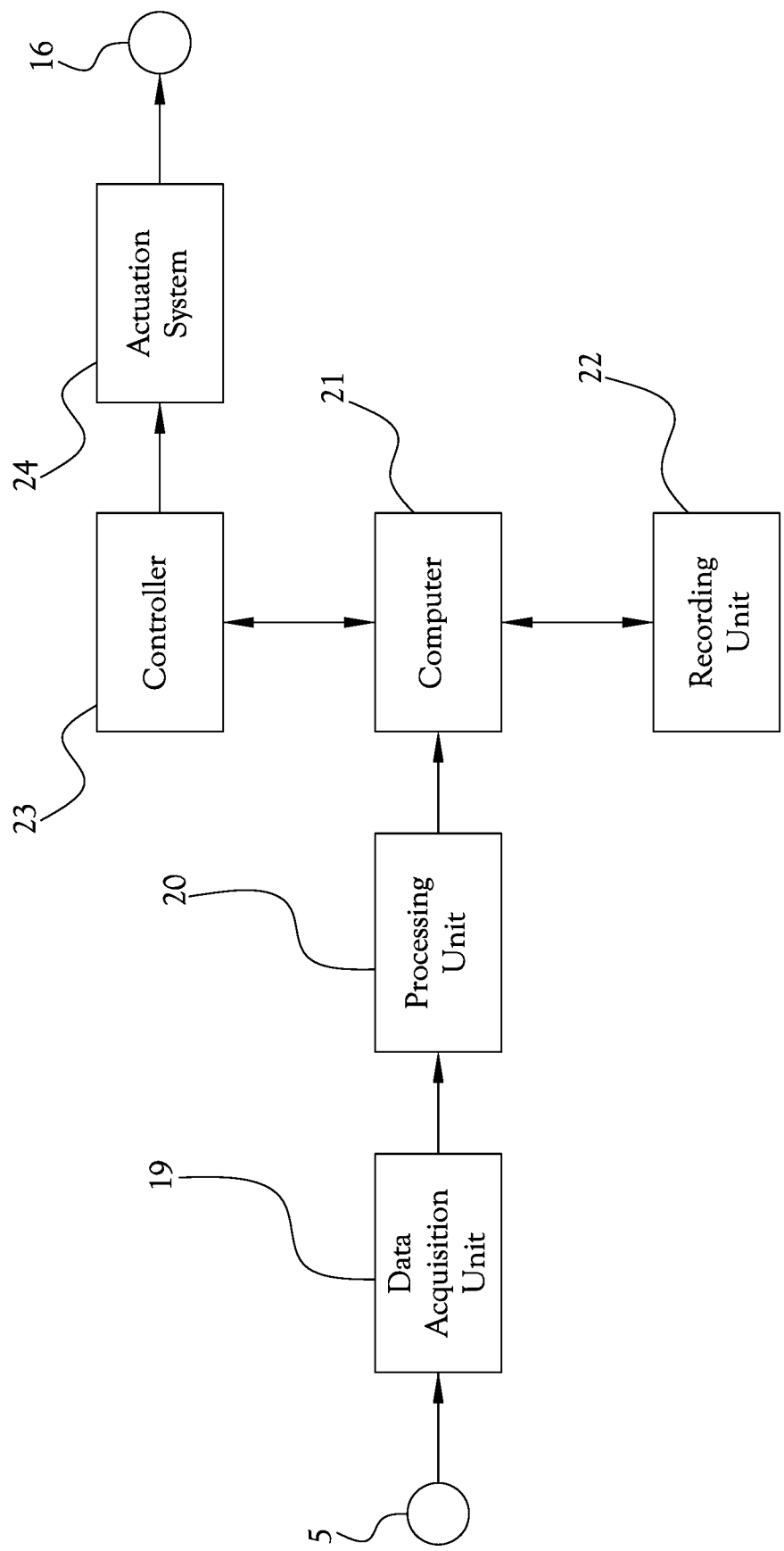
FIG. 4 is a block diagram of one embodiment of the proposed invention.

FIG. 4 illustrates an example embodiment of structure of a system that can be coupled to a differential pressure-based level measurement system as described herein. Here, a differential pressure sensor 5 can be connected to a multi-channel data acquisition unit 19 to receive sensor signals and send them to a processing unit 20 to calculate fluid level. A computer 21 can be incorporated into the system to provide data to a recording unit 22 and a controller 23. The controller 23 can provide input to an actuation system 24 to open a relief valve 16 and based on received and processed sensor data in order to mitigate leaking.

Example embodiments of the present general inventive concept provide a leak safe fluid level measurement system that is based on pressure or differential pressure using a sensor coupled to an instrument channel installed within a tank or vessel to enable measurement of the hydrostatic head or weight of the fluid without the need for a penetration through the tank or vessel below the fluid surface.

As illustrated and describe herein, example embodiments of the present general inventive concept can be achieved by a fluid level measurement system, including an instrument line configured for installation within a fluid storage tank or vessel, the instrument line having a first end configured to be installed below a fluid level of the storage tank and a second end configured to be installed above the fluid level of the storage tank, the first end including a first pressure diaphragm plate configured to communicate with fluid within the storage tank, a pressure sensor configured to be connected to the second end of the instrument line, and a relief valve configured to open and allow high-pressure gas in the tank to escape through a ventilation port in order to depressurize the tank until it equalizes with the surrounding atmosphere so as to mitigate leaks of the liquid in the tank as a result of failure of the penetrations in the instrument line.

The system can include a second pressure diaphragm plate configured to seal the second end of the instrument line.

The system can include an upper penetration provided on the top surface of storage tank between the second pressure diaphragm plate and the pressure sensor. The pressure sensor can be a differential pressure sensor including a low-pressure input port configured on the top of the storage tank to provide a reference measurement of closed system pressure within the storage tank above the fluid level. The instrument line can be filled with oil or another fluid or material. The instrument line can be a capillary, tube, or similar small-diameter channel. The instrument line may be standalone or integrated within the wall of the tank or vessel.

Example embodiments of the present general inventive concept can be achieved by coupling a data acquisition and processing system to the pressure or differential pressure sensor of the described fluid level measurement system, the data acquisition and processing system being configured to receive sensor signals, process the pressure or differential pressure sensor data to calculate fluid level, store the fluid level data, transmit the fluid level data to another plant system, and automatically initiate actuation of the emergency pressure equalizing system in the event of a leak.

The present general inventive concept can be embodied as computer-readable codes configured to run on a testing device to instruct the testing device to perform the data transfer operations. The computer readable-codes can be embodied on a computer-readable storage medium for installation on the described hardware. The computer-readable medium can include a computer-readable recording medium and a computer-readable transmission medium. The computer-readable recording medium can be any data storage device that can store data as a program which can be thereafter read by a computer system. Examples of the computer-readable recording medium include read-only memory (ROM), random-access memory (RAM), CD-ROMs, DVDs, jump drives, magnetic tapes, floppy disks, and other optical or solid state data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission over a network). Also, functional programs, codes, and code segments to accomplish embodiments of the present general inventive concept can be easily construed by programmers skilled in the art to which the present general inventive concept pertains after having read the present disclosure.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While example embodiments have been illustrated and described, it will be understood that the present general inventive concept is not intended to limit the disclosure, but rather it is intended to cover all modifications and alternate devices and methods falling within the spirit and the scope of the invention as defined in the appended claims.

What is claimed is:

1. A fluid level measurement system, comprising: an instrument line configured for installation within a fluid storage tank or vessel, the instrument line having a first end configured to be installed below a fluid level of the storage tank and a second end configured to be installed above the fluid level of the storage tank, the first end including a first pressure diaphragm plate configured to communicate with fluid within the storage tank;
   a second pressure diaphragm plate configured to seal the second end of the instrument line;
   a pressure sensor configured to be connected to the second end of the instrument line; and
   a relief valve configured to open and allow high-pressure gas in the tank to escape through a ventilation port in order to depressurize the tank until tank pressure equalizes with the surrounding atmospheric pressure.

2. The system of claim 1, further comprising an upper penetration provided on the top surface of storage tank between the second pressure diaphragm plate and the pressure sensor.

3. The system of claim 1, wherein the pressure sensor is a differential pressure sensor including a low pressure input port configured on the top of the storage tank to provide a reference measurement of closed system pressure within the storage tank above the fluid level.

4. The system of claim 2, wherein the instrument line is filled with oil or another fluid or material.

5. A fluid level measurement system, comprising:
   an instrument line configured for installation within a fluid storage tank or vessel, the instrument line having a first end configured to be installed below a fluid level of the storage tank and a second end configured to be installed above the fluid level of the storage tank, the first end including a first pressure diaphragm plate configured to communicate with fluid within the storage tank;

a pressure sensor configured to be connected to the second end of the instrument line; and a relief valve configured to open and allow high-pressure gas in the tank to escape through a ventilation port in order to depressurize the tank until tank pressure equalizes with the surrounding atmospheric pressure;

wherein the pressure sensor is a differential pressure sensor including a low pressure input port configured on the top of the storage tank to provide a reference measurement of closed system pressure within the storage tank above the fluid level.

* * * * *